United States Patent [19]
Kech et al.

[11] Patent Number: 6,028,386
[45] Date of Patent: *Feb. 22, 2000

[54] WINDING SUPPORT FOR AN ELECTRIC MOTOR

[75] Inventors: Hansjurgen Kech, Herdecke; Albert Genster, Marl; Uwe Dreihaus, Hamm, all of Germany

[73] Assignee: Wilo GmbH, Dortmund, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/024,695

[22] Filed: Feb. 17, 1998

[30] Foreign Application Priority Data

Feb. 17, 1997 [DE] Germany ............... 197 05 974

[51] Int. Cl.⁷ .................... H02K 3/46; H02K 5/22; H02K 5/12
[52] U.S. Cl. .................. 310/194; 310/86; 310/89; 310/71; 310/254; 417/321
[58] Field of Search ................... 310/86, 87, 89, 310/91, 185, 194, 214, 254, 71, 94, 43; 417/321

[56] References Cited

U.S. PATENT DOCUMENTS

| | | | |
|---|---|---|---|
| 2,310,761 | 2/1943 | Daiger | 62/119.5 |
| 2,445,986 | 7/1948 | Adamson | 171/252 |
| 2,506,629 | 5/1950 | Bilde et al. | 310/254 |
| 4,203,048 | 5/1980 | Sato | 310/268 |
| 4,475,873 | 10/1984 | Jensen et al. | 417/422 |
| 4,668,898 | 5/1987 | Harms et al. | 310/254 |
| 4,852,245 | 8/1989 | Denk | 29/596 |
| 5,117,138 | 5/1992 | Trian | 310/89 |
| 5,280,210 | 1/1994 | Kress et al. | 310/158 |
| 5,334,897 | 8/1994 | Ineson et al. | 310/89 |
| 5,486,728 | 1/1996 | Hirama | 310/40 MM |

FOREIGN PATENT DOCUMENTS 36 29 049 A1 3/1988 Germany.
39 31 988 A1 4/1991 Germany.

OTHER PUBLICATIONS

Derwent WPI English abstract of DE 36 29 049, Erneker, published Mar. 3, 1988.
Derwent WPI English abstract of DE 39 31 988, Kaul & Schmalfuss, publ. Apr. 4, 1991.

Primary Examiner—Elvin Enad
Assistant Examiner—Karl I. E. Tamai
Attorney, Agent, or Firm—Milton Oliver, Ware, Fressola, Van Der Sluys & Adolphson LLP

[57] ABSTRACT

The present invention relates to an electric motor having a winding support (9) for the windings of the motor stator. The winding support is formed with a cylindrical coaxial space having a first end (16) which is at least partially closed and a second end (14) which is open. A plurality of regularly spaced bars (10) are formed on said winding support (9). Certain of the bars, preferably alternate ones of the bars, are formed with an elongated, outwardly extending projection, adapted for placement thereon of a generally oval winding of the motor stator. Preferably, the partially closed first end (16) has a central opening, into which a bearing (7) for the rotor shaft (4) or a stepped end of a split bell can be inserted.

7 Claims, 3 Drawing Sheets

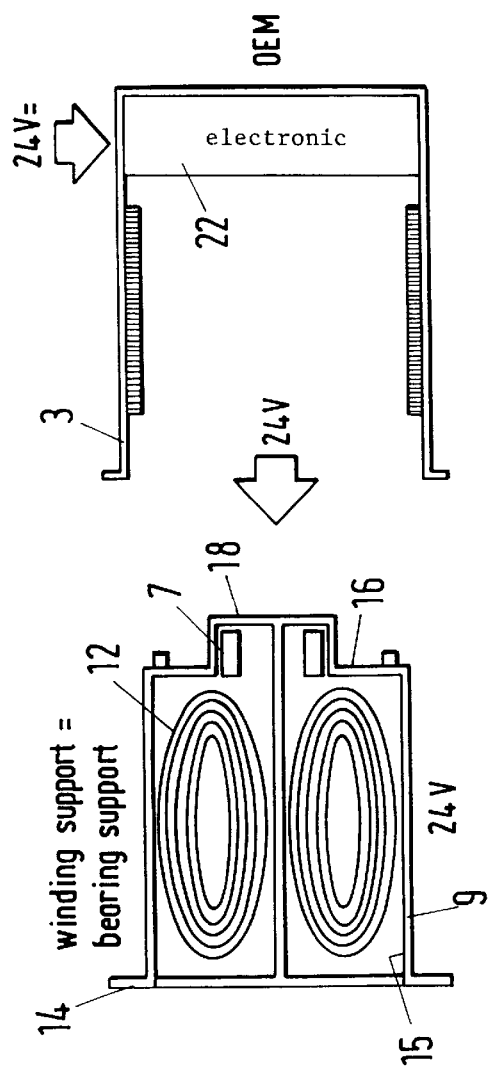
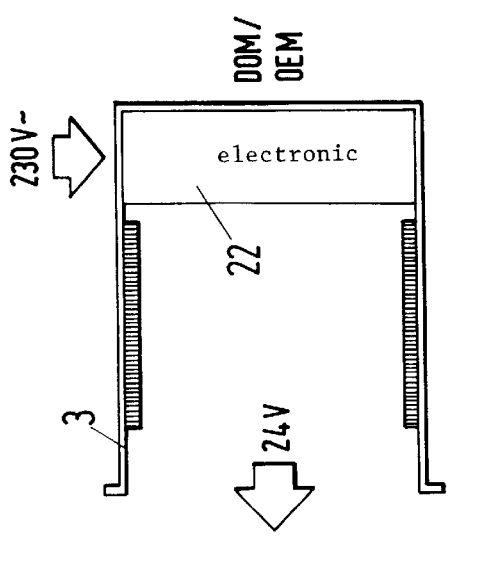
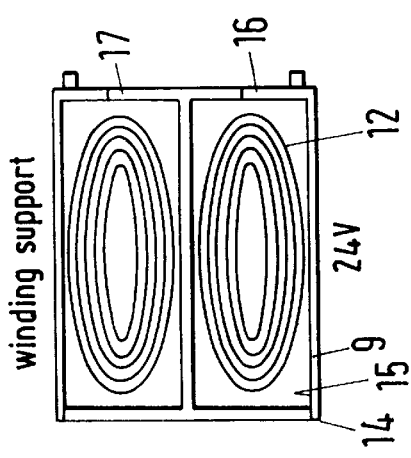
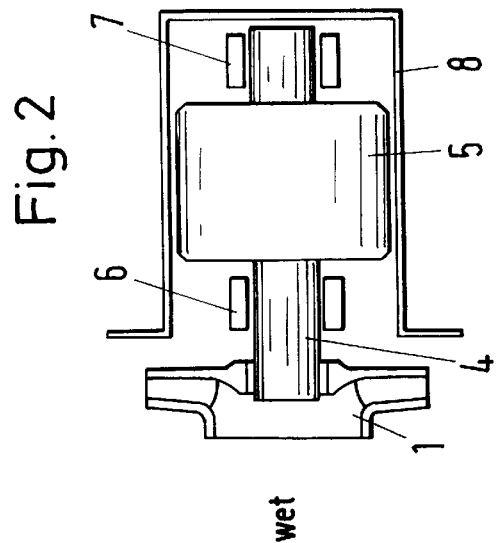
Fig. 2
Fig. 3

# WINDING SUPPORT FOR AN ELECTRIC MOTOR

FIELD OF THE INVENTION

The present invention relates generally to electric motors and, more particularly, to an electric motor with an improved support or carrier for the windings of the motor stator.

BACKGROUND

The winding support has a cylindrical coaxial cavity having a first end (16) at least partially closed and a second, opposing end (14) which is open, the rotor (5) of the motor projecting through this open end (14) into the cavity. Such electric motors with internal rotors are known. In these conventional electric motors, the manufacture and assembly of the stator windings and of the entire motor is difficult.

SUMMARY OF THE INVENTION

Accordingly, it is an object of the present invention to so improve the electric motor of the aforementioned type, that a modular construction process is used, in which the winding support and its windings can be simply made, mounted, and replaced, if necessary. Further, good cooling of the motor should be achieved. Still further, automatic assembly should be made possible.

These objects are achieved, in accordance with the present invention, by arranging, on the circumference of the winding support, axially parallel bars at regular intervals. Some of the bars, preferably every second bar, have elongated, axially parallel projections extending outward, onto each of which a winding, with its inner elongated opening, is slid from outward, preferably in a radial direction. The partially closed end side has a central opening, in which a bearing for the rotor shaft or a stepped end of a split bell can be slid.

Such a winding support is especially simple to make and assemble. The individual, essentially oval, wound windings need only to be slid radially from outside onto the support.

In the case of split-tube motors, the winding support bears the entire stator winding, and can be slid, along with it, onto the split bell. Thus, pre-made windings for differing voltages can be automatically mounted onto the split bell, windings can be subsequently modified, or windings can be easily replaced in case of defects. In the case of a metallic split bell, the windings or coils placed on the winding support are so electrically insulated, with respect to it, that the segmented design (cooling channels) of the surface of the winding support makes possible a very good heat transfer to the transported medium in the split bell.

In the case of an embodiment in which the split bell is made of plastic, the winding support need not be assembled as a separate part onto the split bell, but rather, while retaining its surface geometry, it can be formed directly onto the split bell; i.e. only a single plastic injection-molded part is needed.

In the case of pump motors with dry-impeller structure, the winding support serves simultaneously as forward- and rear-bearing support. The segmented surface of the winding support thus defines so-called "cooling channels" between the winding positions. The rotation of the rotor has the effect that, with the aid of the cooling channels, the cooling medium (air) flows directly through the windings. In closed, non-surface-cooled motors, an inner cooling path is thus formed, which cools the machine. By corresponding shaping of the face side of rotor geometry (molded-on stems, fanblades), the cooling effect can be further strengthened.

It is especially advantageous, if the at-least-partially closed end side bears the electrical contacts for the ends of the winding wires.

The contact elements can be formed as plug contacts, with which terminal connections such as those of the motor, the control electronics, and or the power supply connections can be contacted. In the case of the winding support, the contact elements are formed as plug contacts, into which the modular motor, control-electronics, and power supply connections can be made. Supplemental circuit connections between windings and motor electronics (commutation electronics) as known in classical motor structure, can thus be omitted.

The geometric form of the winding support makes possible the precise positioning of auxiliary elements such as winding protectors (Positive Coefficient of Temperature elements) or additional sensors (Hall transducers, temperature sensors . . . ); the terminal ends of these elements can, in the same form as the winding ends, be arranged at a central contact bar in the winding support.

It is particularly advantageous, if an electrical contact module can be coaxially inserted into the end face of the motor housing which is remote from the pump or fan impeller, the contact module containing electrical terminal elements and electronic components.

It is advantageous if bars formed between the windings serve as separating walls between adjacent windings. Bars having projections on them can extend radially outward less than the bars which form the separating walls. The projections can define an outwardly opening recess, into which a guide finger for an automatic winding assembler can engage.

BRIEF FIGURE DESCRIPTION

FIG. 2 is an exploded schematic view through a motorized rotary pump (for a wet or liquid-moving application) with a split bell;

FIG. 3 is an exploded schematic view through a fan (i.e. for a dry or air-moving application);

DETAILED DESCRIPTION

Figure 1:
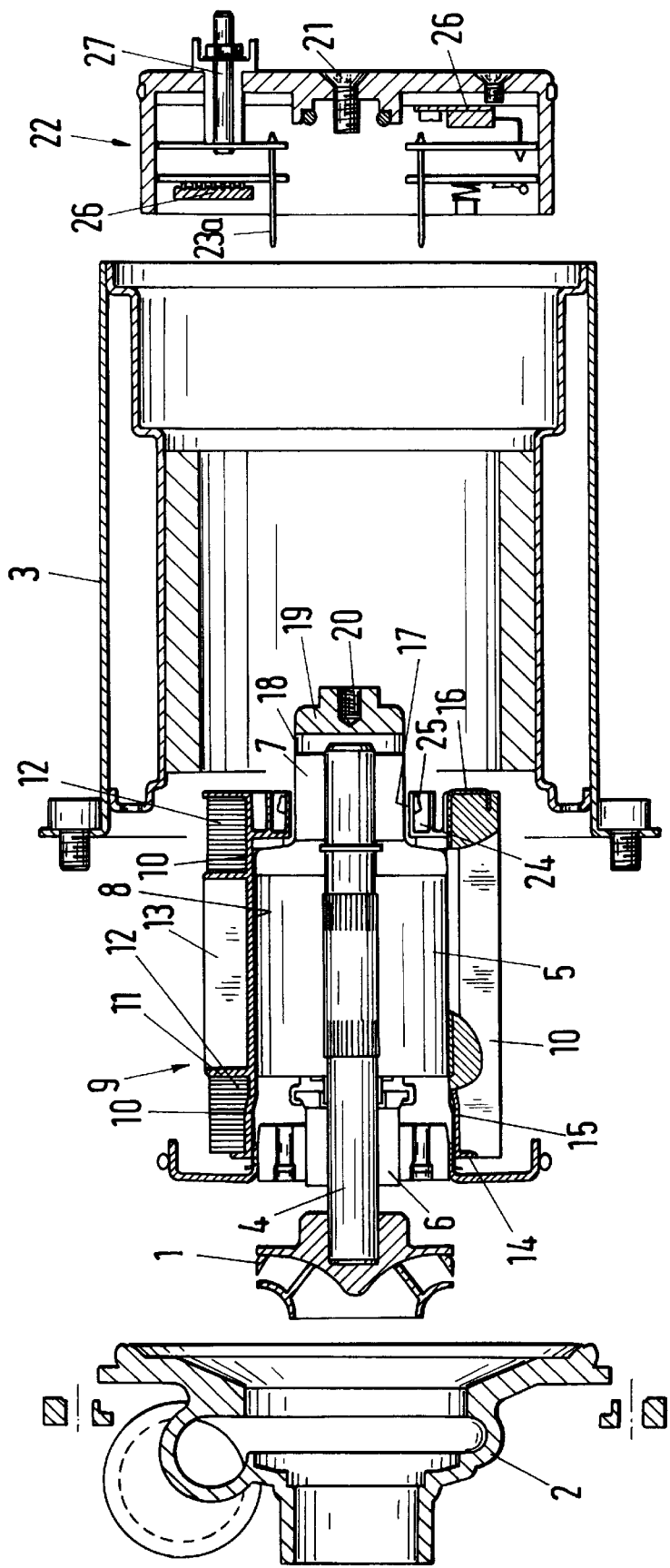
FIG. 1 is an exploded view of axial cross-section through a motorized rotary pump with a split bell.
Figure 4:
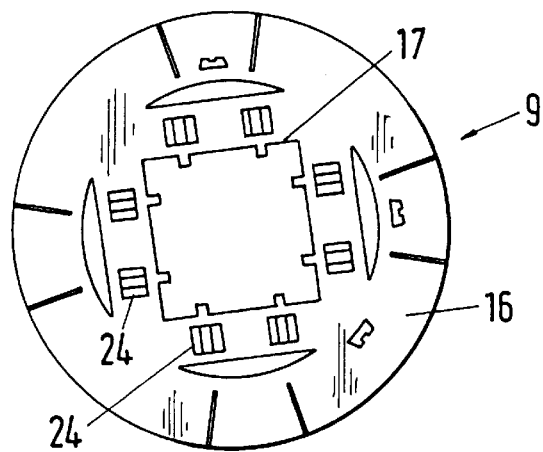
FIG. 4 is a view of the partially closed end side of the winding support (shown without windings)
Figure 5:
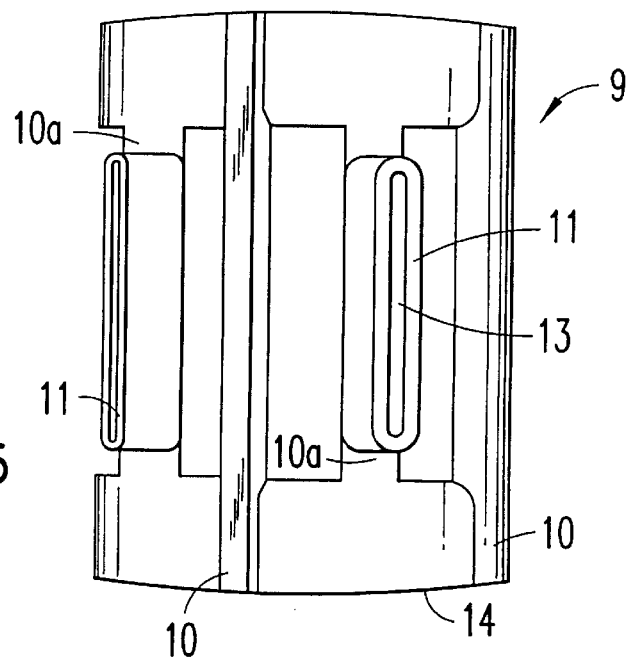
FIG. 5 is a side view of the winding support (without windings)

In the motorized rotary pump shown in FIGS. 1–2, the pump impeller 1 is located inside a pump housing 2, onto which a motor housing 3 is screwed. The pump impeller 1 sits on the end of a motor shaft 4, which supports the motor rotor 5 and is retained in bearings 6, 7. Bearing 6 is at the impeller-adjacent side of rotor 5 and bearing 7 is at the impeller-remote side of rotor 5.

Figure 6:
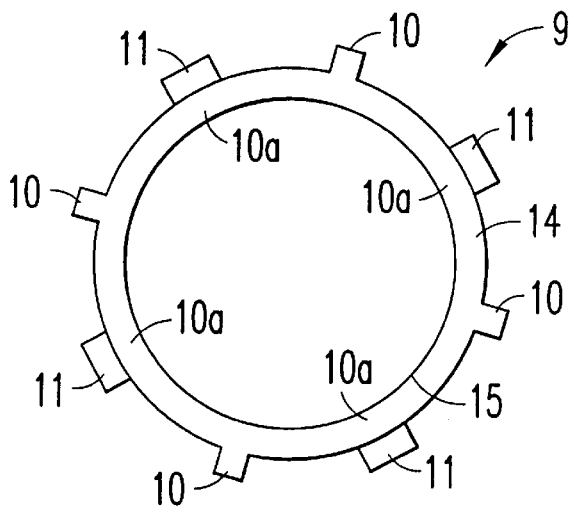
FIG. 6 is a view of the open end side of the winding support (without windings).

Motor shaft 4, rotor 5, and bearings 6,7 are located inside a split bell 8, onto whose outer surface a winding support 9 is slid. Winding support 9 is composed of plastic or metal and is formed on its exterior with axially parallel bars 10 (see FIG. 6), arranged at regular intervals. On some of bars 10, preferably on every second bar, there are formed elongated axially parallel, outwardly extending projections 11, onto each of which is radially slid from outward a respective oval winding 12 with its inner elongated opening. The projections 11 feature outwardly open recesses 13, into which a guide finger for the automatic winding assembler can engage.

Every second axially parallel bar 10, which has no projection 11, serves as a separating wall between the windings, so that adjacent windings cannot touch each other. The bars 10a, which have projections 11, extend less far radially outward than the bars 10, which form the separating walls.

The essentially cylindrical or bell-shaped winding support 9 has a first open end wall 14, through whose central opening 15 can be inserted the rotor 5 with shaft 4 and bearings 6,7. The opposing end wall 16 of winding support 9 is partially closed, i.e. it has a smaller central coaxial opening 17, into which or through which (see FIG. 1) a bell- or pot-shaped coaxial region 18 of split bell 8 projects. The diameter of region 18 is smaller than the remaining diameter of split bell 8. Inside region 18 is located the bearing 7 of shaft 4.

On the outer face side of region 18 is mounted a securing element 19, in which is formed an outwardly-opening coaxial threaded bore 20, into which can be screwed a threaded portion 21 of an electrical contact module 22. Motor housing has, on the side remote from pump housing 2, a recess 23 open toward the outer motor housing face, into which recess 23 the electrical contact module 22 can be completely inserted. In the inserted state, contact module 22 engages over the portion of bell-shaped region 18 of split bell 8 which extends beyond winding support 9.

On its winding-support-adjacent side, contact module 22 has a plurality of contact elements 23a which extend as prong contacts into openings 24 in end wall 16 of winding support 9. End wall 16 has a rim surrounding its central opening 17, the rim being formed with a plurality of openings 24 with respective electrical contacts 25 inserted therein, connected to respective windings.

Contact module 26 further includes electronic components, as indicated schematically in FIGS. 2–3, and preferably a power supply terminal 27. Just like the other parts, contact module 26 is mountable in the axial direction, preferably the coaxial direction.

If the aforementioned electric motor is used for a fan, the split bell 8 is omitted, as shown in the embodiment of FIG. 3. The motor rotor 5 rests with its shaft 4 within winding support 9, and the bearing 7 remote from the impeller or fan blade 1 is not supported by split bell 8, but rather directly by winding support 9, in such a manner that bearing 7 rests in a form-locking and/or force-locking (clamping) engagement in opening 17 of end wall 16, just as in the pot-shaped opening 18. In general, in the embodiment according to FIG. 3, the winding support is implemented in an identical or similar manner, and the contact module 22 is arranged and mountable in the same manner.

Various changes and modifications are possible within the scope of the inventive concept. In particular, features of one embodiment may be combined with features of another embodiment. Therefore, the invention is not limited to the particular embodiments shown and described, but rather is defined by the following claims.

What is claimed is:

1. An electric motor having a winding support (9) for a plurality of windings of a motor stator, said winding support being formed with a cylindrical coaxial cavity, having a first end side (16) which is at least partially closed and an opposing end side (14) which is open, a rotor (5) of said motor extending through said open end side (14) into said cavity, wherein the winding support (9) is an integral plastic element, a plurality of axially parallel bars (10, 10a) are arranged at intervals on said winding support (9);

every Nth one (where N is a positive integer) of said bars (10a) is formed with an elongated, outwardly extending projection (11) onto which is mounted a respective winding (12) which engages over said projection (11), and the projection has an inner elongated opening (13);

said winding support (9) has two ends, a first one (16) of which is partially closed but has a central opening (17) which supports a bearing (7) for a rotor shaft (4) of said motor;

and wherein electrical contacts (25) for ends of said windings (12) are provided in said partially closed end (16) of said winding support (9).

2. An electric motor with a winding support according to claim 1, wherein said winding support (9) supports all stator windings of said motor.

3. An electric motor according to claim 1, wherein said electrical contacts (25) are plug contacts for at least one of motor terminals, control electronics terminals; and power supply terminals.

4. An electric motor according to claim 3, further comprising a motor housing having an impeller-adjacent end face and an impeller-remote end face, said impeller-remote end face being shaped for coaxial reception therein of an electrical terminal module (22) having electrical contacts (27) and electronic components (26).

5. An electric motor according to claim 1, wherein some of said axially parallel bars (10), formed on said winding support, define separating walls between windings (12) of said motor.

6. An electric motor according to claim 1, wherein some of said axially parallel bars (10) define separating walls between motor windings (12), and others (10a) of said bars are formed with projections (11) but, except for said projections, extend radially less outward than said bars (10) defining separating walls.

7. An electric motor according to claim 6, wherein said projections (11) are each formed with an outwardly open recess (13) adapted for insertion of a guide finger of an automatic winding assembly machine.

\* \* \* \* \*

UNITED STATES PATENT AND TRADEMARK OFFICE
CERTIFICATE OF CORRECTION

PATENT NO. : 6,028,386
DATED : February 22, 2000
INVENTOR(S) : Kech et al.

It is certified that error appears in the above-identified patent and that said Letters Patent is hereby corrected as shown below:

column 4, line 16, (claim 1), "elongated" should be deleted.

column 4, line 30, (claim 3), ";" should be --,--.

Signed and Sealed this

Nineteenth Day of December, 2000

Attest:

Q. TODD DICKINSON

*Attesting Officer*       *Commissioner of Patents and Trademarks*